US 7,952,668 B2

(12) United States Patent
Kakinuma et al.

(10) Patent No.: US 7,952,668 B2
(45) Date of Patent: May 31, 2011

(54) DISPLAY MEDIUM, AND MANUFACTURING METHOD AND APPARATUS OF THE DISPLAY MEDIUM

(75) Inventors: Takeo Kakinuma, Kanagawa (JP); Shigeru Yamamoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 544 days.

(21) Appl. No.: 12/046,650

(22) Filed: Mar. 12, 2008

(65) Prior Publication Data
US 2009/0073351 A1 Mar. 19, 2009

(30) Foreign Application Priority Data
Sep. 19, 2007 (JP) ................. 2007-242421

(51) Int. Cl.
*G02F 1/1333* (2006.01)
(52) U.S. Cl. .......................... 349/122; 349/86
(58) Field of Classification Search .............. 349/89, 349/86, 122; 445/66; 264/4.7, 4.33; 359/296; 345/107
See application file for complete search history.

(56) References Cited

U.S. PATENT DOCUMENTS

| | | | |
|---|---|---|---|
| 6,174,467 B1 * | 1/2001 | Hsu | 264/4.7 |
| 6,908,036 B2 * | 6/2005 | Koshimizu et al. | 235/492 |
| 7,636,191 B2 * | 12/2009 | Duthaler | 359/296 |

FOREIGN PATENT DOCUMENTS
JP A-05-080303 4/1993
JP A-2005-316243 11/2005
* cited by examiner

*Primary Examiner* — Thoi V Duong
(74) *Attorney, Agent, or Firm* — Oliff & Berridge, PLC

(57) ABSTRACT

A display medium including: a pair of substrates; a pair of electrodes disposed on the pair of substrates, and facing each other; and a functional layer and a display layer disposed between the pair of electrodes with an adhesive layer disposed between the functional layer and the display layer. The display layer includes a binder and microcapsules dispersed in the binder. The microcapsules have a polymer serving as a wall material, and a liquid crystal enclosed therein. A shape of an interface of the display layer at least on the side of the adhesive layer in a cross section along a thickness direction of the disposed layers is an irregular line having a distance between a highest protruding portion and a lowest depressed portion is from about 0.5 μm to about 2.0 μm.

10 Claims, 7 Drawing Sheets

DISPLAY MEDIUM, AND MANUFACTURING METHOD AND APPARATUS OF THE DISPLAY MEDIUM

CROSS-REFERENCE TO RELATED APPLICATION

This application is based on and claims priority under 35 USC 119 from Japanese Patent Application No. 2007-242421 filed on Sep. 19, 2007.

BACKGROUND

1. Technical Field

The present invention relates to a display medium, a manufacturing method of the same, and also an apparatus for manufacturing the display medium.

2. Related Art

Attention has recently been focused on a display medium using a cholesteric liquid crystal due to it having a memorization ability whereby a display can be maintained even when the power has been turned off, and because it is capable of obtaining a bright display because no polarization plate is used, and because it is capable of performing color display without using a color filter (see Japanese Patent Application Laid-Open (JP-A) No. 5-80303).

The cholesteric liquid crystal is composed of rod-like molecules oriented in a helical manner, and has the property of performing interferential reflection of light coinciding with a helical pitch of the liquid crystal (this reflection is also referred to as "selective reflection"). Thus, due to the helical pitch being set to have a magnitude corresponding to each of the wavelengths of red light, green light and blue light, the cholesteric liquid crystal can display colors brightly without using a color filter.

On the other hand, a binder dispersion type display medium is known in which display material is dispersed and held in a binder, for example, a display medium in which microcapsules holding the display material are dispersed in a binder material such as a resin. Examples of the display medium include: an electrophoretic display element in which insulating oil containing charged color particles is formed into microcapsules; a magnetophoresis display element in which insulating oil containing magnetic particles is enclosed in microcapsules; a liquid crystal display medium in which liquid crystal material is enclosed in microcapsules; and the like.

Further, a display medium is also known in which a display material is processed into a liquid and dispersed in a solution of a binder material in which the display material is insoluble, and then applied by coating and dried. For example, a liquid crystal display element having a display element manufactured by applying and drying a liquid crystal material dispersed in an aqueous solution of a water-soluble resin. Moreover, a display element in which a binder material and a display material are uniformly dissolved using solubilizing means such as a solvent or heating, and then phase-separated from each other by adding external stimulation such as heat or light is also known. Examples thereof include a polymer dispersion type liquid crystal display element prepared by phase separation of a resin and a liquid crystal material from a co-solvent solution by solvent drying, and a polymer dispersion type liquid crystal display element prepared by using photo-polymerization phase separation from a mixed solution of a photo-polymerization monomer and a liquid crystal material.

In the aforementioned binder dispersion type display medium, a display material is dispersed and enclosed in a binder solution, and therefore, the processes of forming containers and enclosing the display material in capsules are not required. Further, the thickness of the material is maintained due to the strength of the binder, and therefore, it is not necessary to provide a spacer. The binder serves as a wall, and therefore, a process of forming a flow prevention wall is not required. Hence, the structure may be simplified and the number of manufacturing processes reduced, which reduces costs.

In the binder dispersion type display medium described above, generally, a display layer is formed by coating a substrate with a binder solution in which a display material is dispersed. For the purpose of protecting the coated surface or providing a functional layer thereon, another substrate may be bonded on the display layer. In particular, when the display material is a voltage response type material and display of a desired pattern or an arbitrary pattern is desired, a display layer is interposed between a pair of substrates having, transparent conductive films such as ITO (Indium Tin Oxide) as electrodes formed therein, so as to apply a voltage to the display layer.

In this case, first the display layer is applied and formed on one of the electrode-attached substrates, and subsequently, the other electrode-attached substrate having the functional layer or the like formed thereon is bonded to the display layer, and thus the display medium is manufactured.

A liquid crystal display medium in which the liquid crystal material is enclosed in microcapsules is known, the display medium being formed such that a cholesteric liquid crystal contains a polymer or solid matter such as a microcapsule shell, and a semi-solid display layer is formed overall (for example, see Japanese Patent Application Laid-Open (JP-A) No. 2005-316243).

In manufacturing the aforementioned display medium, it is effective to use a method in which a microcapsule dispersion liquid is applied to one of the substrates, and thereafter, the substrate is bonded to the other substrate in air, which facilitates production of a large-size liquid crystal element and highly efficient production of a large-area liquid crystal element.

The development of the aforementioned display medium for use as electronic paper (E-paper) has also been proceeding. For applications of the display medium, a display medium that allows high image quality is desired. Particularly, in order to display small-size characters, improvements regarding the resolution and graininess of images are desired.

SUMMARY

According to an aspect of the present invention, there is provided a display medium including: a pair of substrates; a pair of electrodes disposed on the pair of substrates and facing each other; and a functional layer and a display layer disposed between the pair of electrodes with an adhesive layer disposed between the functional layer and the display layer. The display layer includes a binder and microcapsules dispersed in the binder. The microcapsules have a polymer serving as a wall material and a liquid crystal enclosed therein. A shape of an interface of the display layer at least on the side of the adhesive layer in a cross section along a thickness direction of the disposed layers is an irregular line (a wave-like line) such that a distance between a highest protruding portion and a lowest depressed portion is from about 0.5 μm to about 2.0 μm.

BRIEF DESCRIPTION OF THE DRAWINGS

Exemplary embodiments of the present invention will be described in detail based on the following figures, wherein.

DETAILED DESCRIPTION

Figure 1:
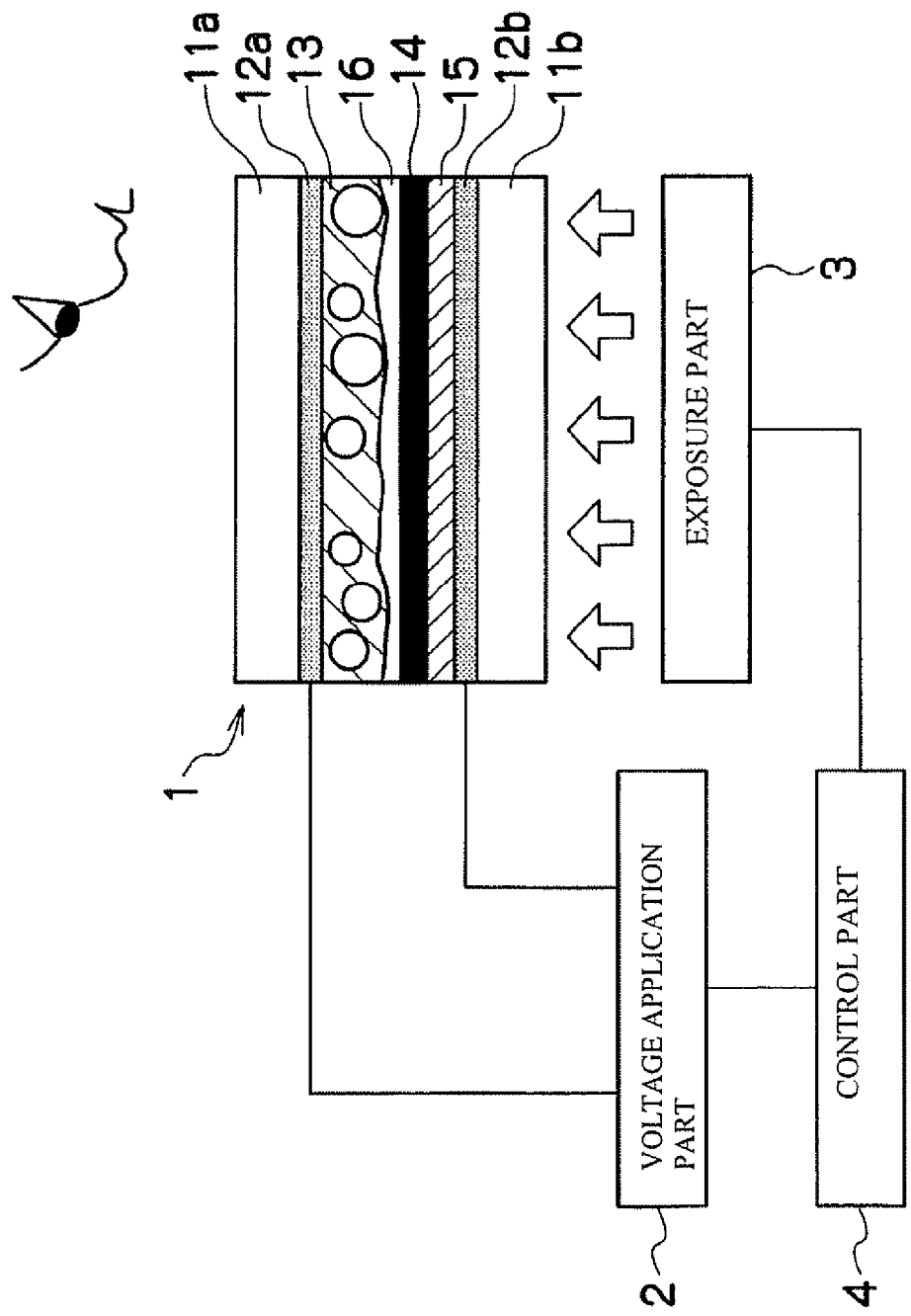
FIG. 1 is a schematic cross sectional view showing an example of a display medium according to an exemplary embodiment of the present invention.

In the binder dispersion type display medium in which microcapsules of liquid crystal are dispersed in a display layer, in principle, it is advantageous that the microcapsules are made as large as possible from the viewpoint of the display performance. To this end, if the display layer is formed by applying, on a substrate, a binder solution containing microcapsules dispersed therein, irregularities are generated on the surface of the display layer by being reflected by granulation of the dispersed microcapsules. This tendency becomes remarkable particularly in the case of a microcapsule containing a polymer that serves as wall material. For this reason, in a case in which a substrate with the display layer formed thereon, and a substrate with a functional layer formed thereon are bonded to each other via an adhesive layer, air bubbles generated by the irregularities formed on the surface of the display layer may remain in the adhesive layer. The remaining air bubbles reflect light, and therefore, there arise problems that a display contrast ratio may be lowered, display roughness may increase, whereby the appearance quality of display deteriorates.

The present invention has been achieved in view of the aforementioned circumstances.

The present invention will be hereinafter described in detail by way of exemplary embodiments.

A display medium of the present exemplary embodiment includes a pair of substrates, a pair of electrodes disposed on the pair of substrates, respectively, so as to face each other, and a functional layer and a display layer, which layers are disposed between the pair of electrodes with an adhesive layer provided between these layers. The display layer includes a binder and microcapsules dispersed in the binder. The microcapsules each have a polymer that serves as wall material and liquid crystal enclosed therein, and the shape of the interface of the display layer at the side of the adhesive layer in the cross section along a direction perpendicular to surfaces (a thickness direction) of the disposed layers is a curved line in which a distance between the highest protruding portion and the lowest depressed portion is 0.5 or about 0.5 μm or more, and 2 or about 2 μm or less.

Further, a manufacturing method (apparatus) of a display medium according to the present exemplary embodiment is a method for manufacturing the display medium of the aforementioned exemplary embodiment. This method includes: a display layer forming process (a display layer forming part) in which a display layer is formed on a first substrate; a functional layer forming step (a functional layer forming part) in which a functional layer is formed on a second substrate; a softening/planarizing process (a softening/planarizing part) in which the surface of the formed display layer is softened and planarized; and a bonding process (a bonding part) in which the display layer having a planarized surface and the functional layer are bonded to each other.

The display medium and its manufacturing method (manufacturing apparatus) according to the present exemplary embodiment will be hereinafter described with reference to the attached drawings.

First Exemplary Embodiment

First, a description will be given, as the first exemplary embodiment, of a display medium having one display layer.

FIG. 1 is a schematic cross sectional view showing an example of the display medium of the present exemplary embodiment. In FIG. 1, a driving part of the display medium is also shown simply. In this figure, reference number 1 denotes a display medium, reference number 2 denotes a voltage application part, reference number 3 denotes an exposure part, reference number 4 denotes a control part, reference numbers 11a and 11b denote substrates, reference numbers 12a and 12b denote electrodes, reference number 13 denotes a display layer, reference number 14 denotes a light shielding layer, reference number 15 denotes a photo-conductive layer (functional layer), and reference number 16 denotes an adhesive layer. This example as illustrated shows the structure of an optical recording type display medium using cholesteric liquid crystal.

The display medium 1 is constructed in such a manner that the display layer 13 for realizing a display function, and the photo-conductive layer 15 are interposed between the pair of substrates 11a and 11b. The light shielding layer 14 is provided so as to cut off light transmitted from the rear surface of a reflection type display medium that performs display utilizing reflection of external light, or of a self-luminous type display medium, so as to prevent reduction of a display contrast ratio. Further, in this case, the photo-conductive layer 15 is provided which serves as a switching layer that effects switching of display style by means of light, as will be described below.

The voltage application part 2 is connected to the electrode 12a and also to the electrode 12b. Further, the exposure part 3 is disposed at the surface of the display medium 1 opposite to an observer's side (the upper side in FIG. 1), so as to face the photo-conductive layer 15. The exposure part is used to irradiate light imagewise (a light image) such as a pictorial image or characters. The voltage application part 2 and the exposure part 13 are respectively controlled by the control part 4, so as to apply a voltage in synchronous with exposure processing.

The display medium 1 operates in such a manner as described below.

First, a voltage is applied to between the electrodes 12a and 12b by the voltage application part 2, while a light image being exposed on the photo-conductive layer 15 by using the exposure part 3. As a result, a voltage obtained by voltage dividing by the display layer 13, the light shielding layer 14 and the photo-conductive layer 16 is applied to the display layer 13 constructed so as to contain microcapsules of liquid crystal. At this time, the electric resistance value of the photo-conductive layer 15 varies at different positions thereof depending on the amount of light of the light image. That is to say, the position at which a large amount of light is irradiated exhibits a low resistance, and the position at which a small amount of light is irradiated exhibits a high resistance. Accordingly, the divided voltage applied to the display layer 13 becomes high at the position where a large amount of light is irradiated on the display layer, and the divided voltage becomes low at the position where a small amount of light is irradiated. Hence, alignment of the liquid crystal changes and this is represented as the change of reflectance. The cholesteric liquid crystal is the liquid crystal having memorization ability by which an image is maintained even after the voltage is eliminated. Thus, the aforementioned display medium serves as a display/recording medium.

In the display medium 1 shown in FIG. 1, exposure processing is performed from the side opposite to the observer's side, but it may also be performed from the observer's side. In this case, the light shielding layer 14 is provided between the photo-conductive layer 15 and the electrode 12b.

Figure 2A:
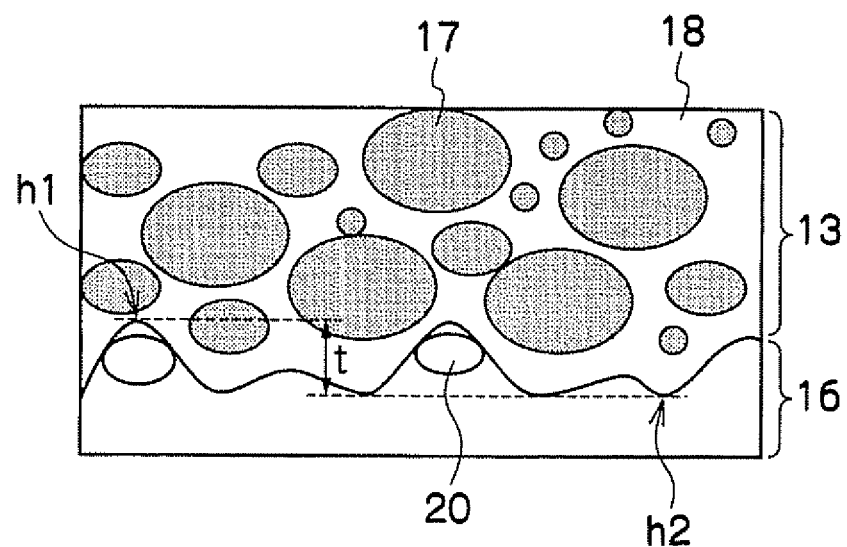
FIGS. 2A and 2B are enlarged cross sectional views each showing an interface portion of a display layer and an adhesive layer.
Figure 2B:
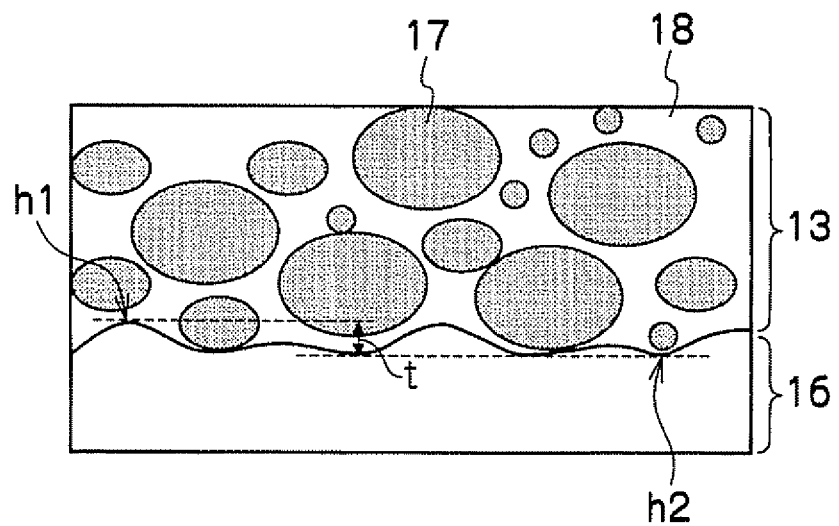

FIGS. 2A and 2B are enlarged views for showing the interface portion of the display layer 13 and the adhesive layer 16 in the display medium shown in FIG. 1. An enlarged sectional view corresponding to the display medium 1 of the present exemplary embodiment is shown in FIG. 2B, and FIG. 2A is an enlarged sectional view corresponding to a conventional display medium shown for comparison.

In FIGS. 2A and 2B, the display layer 13 is constructed in such a manner that liquid crystal capsules 17 formed in the shape of microcapsules by using a polymer as wall material are dispersed in a binder 18.

The display medium shown in FIG. 2A is constructed in such a manner that after the display layer 13 is formed, adhering to the photo-conductive layer 15 is carried out without causing the display layer being made smooth. As shown in this figure, the interface between the display layer 13 and the adhesive layer 16 reflects large irregularities of the display layer 13 as they are, and is formed as wave-like line with many uphills and downhills. Further, air bubbles 20 remain in the interface portion due to the surface irregularities of the display layer 13.

The existence of the air bubbles 20 not only causes reduction of the display contrast ratio and roughness of display, as mentioned above, but also, there are cases in which when a voltage is applied to the display layer 13, the air bubbles may cause variation of the divided voltage applied to the display layer 13, whereby this may be observed as display roughness.

For this reason, remaining air bubbles on the bonded surface between the display layer 13 and the photo-conductive layer 15 may be reduced to the minimum extent possible, and from this viewpoint, the adhesive layer 16 is provided on the bonded surface as shown in these figures. The adhesive layer 16 not only has the function of eliminating the irregularities of the bonded surface and reducing the remaining air bubbles, thereby preventing reflection of light by the air bubbles, but also has the function of eliminating the irregularities of the display layer 13 to reduce variations of the divided voltage. This results from that the variation of the resistance division voltage become smaller as the dielectric constant of dielectric materials (in this case, the air bubbles or the adhesive layer) inserted in series becomes larger, and the dielectric constant of adhesives that form the adhesive layer is usually 3 or more, and is larger than the dielectric constant of the air bubbles (=1).

However, only using the adhesive layer 16, in the case in which hard liquid crystal capsules 17 of a relative large particle size, in which a polymer is used as wall material, are dispersed in the binder 18, the irregularities of the interface cannot be made small as shown in FIG. 2A. Accordingly, the distance t between the highest protruding portion h1 and the lowest depressed portion h2 on the curved line of the interface is large, that is, at least 0.5 µm.

In the present exemplary embodiment, the distance t between the highest protruding portion h1 and the lowest depressed portion h2 is determined in such a manner that the display medium is cut off by a microtome in a direction perpendicular to the surfaces of the disposed layers, the cross section is observed by a transmission type electron microscope with a magnification power of 1000, the distance between the highest protruding portion h1 and the lowest depressed portion h2 in the cross-sectional micrograph is measured, and the measured value is converted.

In the display medium of the present exemplary embodiment as shown in FIG. 2B, as will be described below, after the display layer 13 is formed, the surface thereof is subjected to softening/planarizing processing. Therefore, the surface of the display layer 13 is formed as a smooth surface having an arithmetic average roughness Ra of less than 5 µm or about 5 µm. Accordingly, the shape of the interface between the display layer 13 and the adhesive layer 16 after the display layer is adhered to the photo-conductive layer 15 is a considerably smooth wave-like line as compared with the state shown in FIG. 2A. As a result of the irregularities on the interface being reduced, air bubble as shown in FIG. 2A is not remained.

As a result of studies by the present inventors, in order to obtain the interface having no remaining air bubbles, it is necessary that the distance t between the highest protruding portion h1 and the lowest depressed portion h2 on the curved line of the interface may be 0.5 or about 0.5 µm or more, and 2 or about 2 µm or less. If the distance t is more than 2 µm, air bubbles remain on the interface, or the display contrast is adversely affected even when no air bubble remains. Further, it is practically difficult to make the surface of the display layer 13 smooth such that the distance t is smaller than 0.5 µm.

The distance t is preferably in the range from 0.5 µm to 1.5 µm, more preferably in the range from 0.5 µm to 1 µm.

The display layer 13 of the present exemplary embodiment is planarized by being softened, not by conventional calendering, and therefore, the surface of the display layer 13 is smooth, and at the same time, even if the displayer layer is subjected to planarizing processing to the aforementioned level, microcapsules of liquid crystal within the display layer 13 are not broken. Accordingly, the cross sectional configuration of the display medium of the present exemplary embodiment in which the curve line of the interface between the display layer 13 and the adhesive layer 16 satisfies the aforementioned condition, and no history of stress caused by smoothing is found within the display layer is a specific configuration for the cross sectional configuration of a display medium having a display layer that contains microcapsules each having a polymer serving as wall material.

Figure 3:
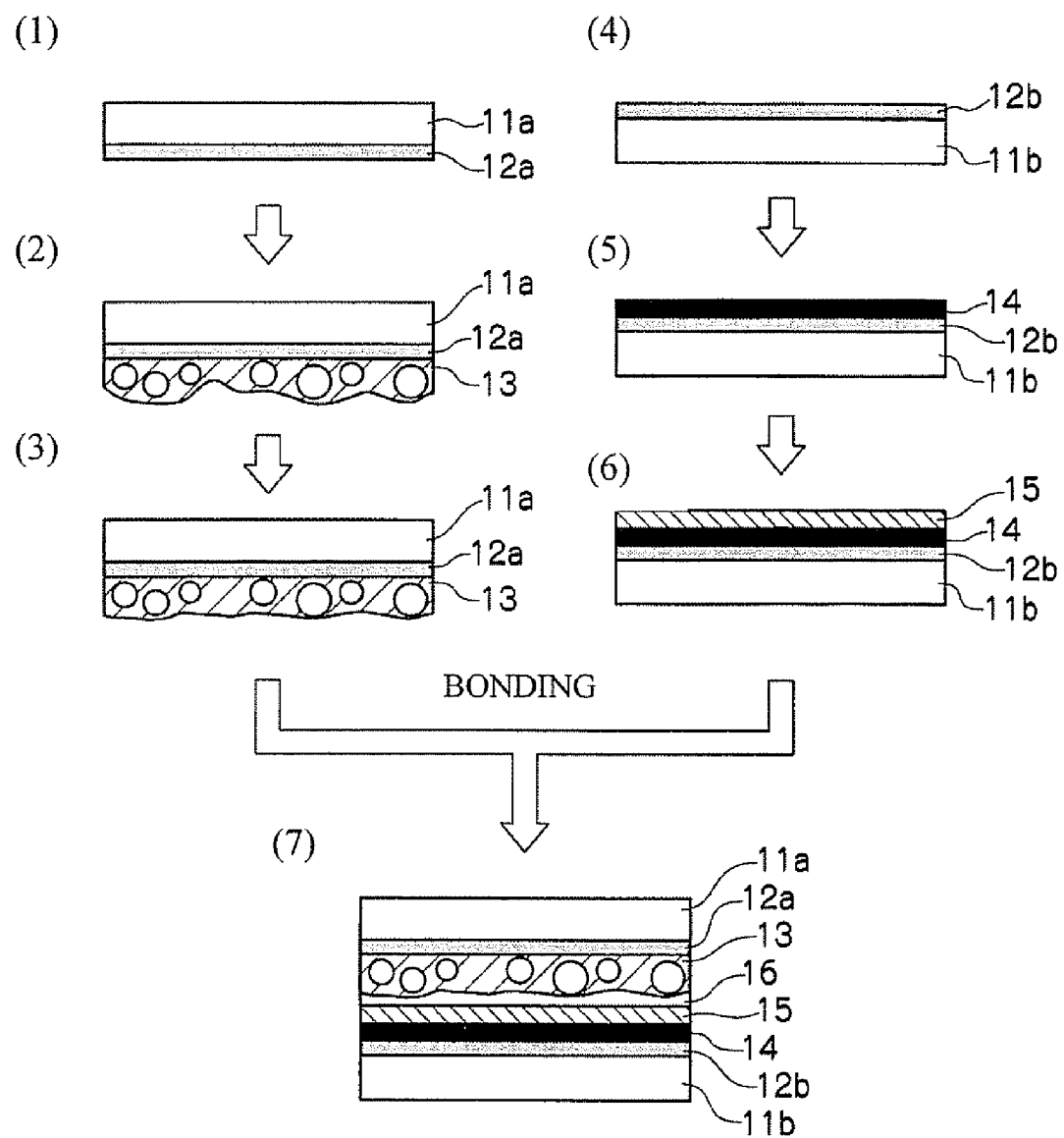
FIG. 3 is a flow diagram showing an example of a manufacturing process of a display medium according to an exemplary embodiment of the present invention.

FIG. 3 is a flow diagram showing an example of a manufacturing process of the display medium according to the present exemplary embodiment. It should be noted that the in the display medium manufactured by this manufacturing process, the light shielding layer is provided at the lower side of the photo-conductive layer in this figure.

First, in the step (1) shown in FIG. 3, the electrode 12a is formed on the substrate (first substrate) 11a. Alternatively, the substrate 11a with the electrode 12a previously formed thereon may be used. Subsequently, in the step (2) shown in FIG. 3, a dispersion liquid prepared by dispersing, in a liquid solution of a binder resin, microcapsules containing cholesteric liquid crystal as core material is applied and dried on the substrate 11a with the electrode 12a formed thereon, whereby the display layer 13 is formed (a display layer forming step). In the step (3) in FIG. 3, the surface of the display layer 13 is subjected to softening and planarizing processing (a softening/planarizing step).

In the step (4) in FIG. 3, the electrode 12b is formed on the substrate (second substrate) 11b, or alternatively, the substrate 11b with the electrode 12a previously formed thereon may be used. In the step (5) in FIG. 3, the light shielding layer 14 is formed on the substrate 11b with the electrode 12a formed thereon. Further, in the step (6) in FIG. 3, the photoconductive layer 15 is formed on the light-shielding layer 14 (a functional layer forming step).

In the step (7) of FIG. 3, the substrate 11a in the step (3) of FIG. 3 and the substrate 11b in the step (6) of FIG. 3 are bonded to each other. Thus, the display medium of the present exemplary embodiment is obtained (a bonding step).

The manufacturing method of the display medium according to the present exemplary embodiment shown in FIG. 3 will be described more specifically.

As the substrate 11a located at the observer's side, a transparent sheet or film, having a proper strength, can be used. The transparency is required for observation of the display layer 13, and the substrate needs to have strength for the reason that it functions as a support member of the display layer 13 during the manufacturing process and also during use. In the case in which an electrode is formed on the substrate 11a to define a voltage application region, the substrate 11a needs to be an insulator.

Examples of the material that forms the substrate 11a include a resin such as polyethylene terephthalate (PET), polycarbonate, polyethersulfone, triacetylcellulose, polyolefin, polyester, polyacrylate, or polymethacrylate, glass such as soda glass or boron silicate glass, and ceramics such as alumina and PLZT.

The substrate 11b disposed at the rear side is used to protect the display layer 13 and provided as a support of the electrode 12b for application of a voltage, and a sheet, film or the like having a proper strength can be used as the substrate 11b. In this case, if the photo-conductive layer 15 is exposed with light from the side of the rear surface, a transparent material is used also for the substrate 11b. However, without such requirement as described above (for example, in the case in which light is irradiated from the observer's side), the substrate 11b may not be transparent. Examples of the material that forms the substrate 11b include transparent materials such as a resin, glass and ceramic. In the case in which the substrate 11b may not be transparent, an opaque material such as a metal plate or metal foil can also be used.

In the case in which a voltage needs to be applied to the display layer 13 as in the present exemplary embodiment, the electrode 12a may be formed in advance on the substrate 11a prior to formation of the display layer 13. In this case, the electrode 12a needs to be transparent as is the case with the substrate 11a. Examples of such electrode material include a thin film of metal such as Au or Al, a conductive oxide such as $In_2O_3$, $SnO_2$, or ZnO, a conductive polymer such as polypyrrole, and the like. The materials of the electrode 12a can be applied to those for the electrode 12b, but as in the case with the rear-surface substrate 11b, unless light transmittance is specifically required, opaque material such as a metal film or carbon electrode, that does not allow transmission of light, can also be used.

The display layer 13 of the present exemplary embodiment is a composite material in which microcapsules of liquid crystal (liquid crystal capsules) are dispersed in a binder. As the liquid crystal, particularly, cholesteric liquid crystal is a particularly useful display material from the viewpoint of easily obtaining arbitrary display color and having a memorization ability.

The cholesteric liquid crystal material is made from a liquid crystal composition having optical activity, and is prepared by:
(1) adding, to a nematic liquid crystal composition, an optically active compound called a chiral agent and the like; or
(2) using a liquid crystal composition that is optically active in itself, as is the case with cholesterol derivative.

In the case of (1), examples of nematic liquid crystal composition include well known nematic liquid crystal composition such as cyanobiphenyl based, phenylcyclohexane based, phenylbenzoate based, cyclohexylbenzoate based, azomethine based, azobenzene based, pyrimidine based, dioxane based, cyclohexyl-cyclohexane based, stilbene based, and tolan based liquid crystals. Examples of the chiral agent include a compound containing an optically active group, such as cholesterol derivative or 2-methylbutyl group.

An additive such as dyestuff or fine particles may be added to the liquid crystal material. The liquid crystal material may be a gelled material prepared by using a cross-linking polymer or hydrogen-bond gelling agent. Further, any one of high-polymer liquid crystal, middle-molecular liquid crystal or low-molecular liquid crystal may be used, or mixture of those materials may be used.

The cholesteric liquid crystal forms color by some type of Bragg reflection called as "selective reflection". The selective reflection wavelength equals to a product of the helical pitch and the average refractive index of the cholesteric liquid crystal. For this reason, the composition ratio of the cholesteric liquid crystal composition is properly adjusted to vary the helical pitch, whereby a desired reflection color can be easily obtained. The helical pitch of the cholesteric liquid crystal can be varied depending on the type of the chiral agent and the amount thereof added, the material of the liquid crystal. The wavelength of selective reflection may be in an ultraviolet wavelength region or in an infrared wavelength region, as well as in a visible wavelength region of light. The average particle size of the cholesteric liquid crystal droplets dispersed in the polymer may be at least three times the helical pitch of the cholesteric liquid crystal in order to exhibit the stable memorization property.

Further, the helical axis of the cholesteric liquid crystal is changed due to application of an electric field. That is to say, when a high voltage pulse is applied, the helical axis takes the form of planar alignment substantially parallel to the normal line of the display layer. When a low voltage pulse is applied, the helical axis is changed to a focal conic state alignment substantially perpendicular to the normal line of the display layer. The selective reflection occurs only at the time of planar alignment, and therefore, the refractive index can be controlled by controlling the direction of the helical axis based on the applied voltage.

The binder is used to disperse and sustain liquid crystal capsules, and the material having light transmission property and proper strength is used. Examples of such material include resins such as an epoxy resin, an acrylic resin, an urethane resin, a polyester resin, a polyamide resin, an olefin resin, a vinyl resin, a phenol resin, and an urea resin, glasses, ceramics and the like. It is not necessary that the binder is colorless, and in consideration of a display effect, the binder may be colored in a desired color. The binder may be soft to a certain degree because it is deformed at the time of bonding of layers to make it difficult for air bubbles to remain.

Further, for the purpose of stabilizing color purity in the display layer, display contrast, or display quality over time, in the case of liquid crystal capsules each having a polymer that serves as wall material, a perpendicular aligning component is introduced to an interface of the cholesteric liquid crystal and the polymer, or in the interior of the polymer, and the horizontal aligning property that the polymer originally has is offset by the perpendicular aligning property obtained by introduction of the perpendicular aligning component, whereby alignment controlling force can be impaired. As a result, the cholesteric liquid crystal layer having a straightened surface having not curvature is obtained, and the color purity and display contrast can be improved.

As the aforementioned perpendicular aligning component that imparts the perpendicular alignment property to the polymer, at least one of a group consisting of a silicon atom, a fluorine atom, an alkyl group, and a halogenated alkyl group may be suitably used. The liquid crystal molecule has a rod-like shape, has a group whose surface energy is high, for example, a benzene group, at the center thereof, and further has a group whose surface energy is low, for example, an alkyl group, at the end thereof. Therefore, the liquid crystal molecules are perpendicularly aligned on the interface with the substance having a low surface energy. Further, it is stable in terms of entropy that, on the interface in which long-chain compounds such as alkyl groups are perpendicularly aligned, the liquid crystal molecules get into clearances between the compounds so as to be parallel to the long-chain compounds rather than being aligned perpendicularly thereto. Thus, the liquid crystals are perpendicularly aligned on the interface as mentioned above. The perpendicular aligning component having both a surface energy effect and an excluded volume effect as is the case with a fluorinated alkyl group is particularly suitably used.

In the present exemplary embodiment, the aforementioned liquid crystal capsules are prepared in such a manner that microcapsules, including cholesteric liquid crystal that serves as core material and a polymer that serves as wall material, are dispersed in another binder resin. In this case, the aforementioned perpendicular aligning component may be introduced into the wall material or the surface of the inner wall of the microcapsule.

As the manufacturing method of the aforementioned liquid crystal, there can be used a microcapsulation method in which cholesteric liquid crystal is used as core material and a polymer is used as wall material.

Examples of the microcapsule manufacturing method include: (1) a phase separation method in which an aqueous polymer solution containing liquid crystals dispersed therein is subjected to phase separation, whereby a membrane is formed on the surface of the liquid crystal droplet; (2) a drying-in-liquid method in which a polymer and liquid crystal are dissolved in a common solvent, and the obtained mixture is dispersed in an aqueous phase, and the solvent is evaporated; (3) an interfacial polymerization method in which a mixed solution (an oil-phase liquid) of liquid crystals and an oil-soluble monomer A are dispersed in an aqueous phase, and a water-soluble monomer B is added to the dispersion liquid, and the monomer A and the monomer B undergo an interfacial polymerization reaction, whereby a membrane is formed; and (4) an in-situ polymerization method in which a monomer is dissolved in liquid crystal or in an aqueous phase and polymerized by heating or the like, whereby a separated polymer forms a membrane.

—Phase-separation Method—

Examples of the phase-separation method include: a complex coacervation method in which, as polymers, two types of water-soluble polymers: such as gelatin and gum arabic; protein and polysaccharides; protein and protein; protein and nucleic acid; or polysaccharides and nucleic acid, are subjected to phase separation into a thick liquid phase and a dilute liquid phase by controlling the pH and temperature; and a simple coacervation method in which, to a solution of water-soluble polymer such as polyvinyl alcohol, gelatin, alkylcellulose or the like, an organic solvent that is phase-soluble with water, for example, alcohol, acetone or the like, is added thereby causing phase separation.

Examples of the method of introducing perpendicular alignment property include: (1) a method of adding a surfactant that is a perpendicular aligning component, to an aqueous phase or an oily phase; and (2) a method in which a precursor of a perpendicular aligning component that undergoes an addition reaction with a functional group of a polymer that forms wall material, for example, a compound having an alkyl group and/or a halogenated alkyl group; and a functional group such as basic acid halide, haloformate, isocyanate, isothiocyanate, ketene, carbodiimide, epoxy, glycidyl ether, oxazoline, ethylenimine, lactone or aldehyde, is added in advance to an oily phase, and after the aforementioned phase separation, addition reaction is made to occur by means such as heating, catalyst addition or the like.

—Drying-in-liquid Method—

As the drying-in-liquid method, for example, there can be used a method in which a polymer in which a perpendicular aligning component is introduced in the main chain or in the side chain thereof is, together with liquid crystal, dissolved in a low-boiling-point solvent, and the obtained mixture is dispersed in the aqueous phase, and then subjected to pressure reduction or heating, thereby causing the solvent to be volatized. Examples of the polymer and solvent as used therein include a combination of a fluororesin and a fluorine-based solvent such as chlorofluorocarbon, a combination of an acryl resin, an urethane resin or a polyester resin, into which an alkyl group or halogenated alkyl group is introduced, and methylene chloride.

—Interfacial Polymerization Method—

In the interfacial polymerization method, examples of the oil-soluble monomer A include polyvalent compounds having plural functional groups such as basic acid halide, haloformate, isocyanate, isothiocyanate, ketene, carbodiimide, epoxy, glycidyl ether, oxazoline, ethylenimine, lactone or the like. Examples of the water-soluble monomer B include polyvalent compounds having plural functional groups such as amine, alcohol, carboxylic acid, mercaptan, phenol or the like.

As the method of introducing perpendicular alignment property, the following methods can be applied: (1) a method of adding a surfactant that is a perpendicular aligning component, to the aqueous phase or oily phase; (2) a method in which a precursor of a perpendicular aligning component that undergoes an addition reaction with the oil-soluble monomer A, for example, a compound having an alkyl croup and/or a halogenated alkyl group, and a functional group such as amine, glycol, carboxylic acid or mercaptan is made to undergo an addition reaction with the oil-soluble monomer A, in advance, and thereafter, the obtained product is mixed with liquid crystal and dispersed in water, and subsequently, made to undergo polymerization reaction with the water-soluble monomer B; (3) a method in which a precursor of a perpendicular aligning component that undergoes an addition reaction with the oil-soluble monomer A is mixed with the oil-soluble monomer A and liquid crystal, and the mixture is dispersed in water, and subsequently, the obtained product is made to undergo an addition reaction synchronously with polymerization reaction with the water-soluble monomer B, whereby perpendicular alignment property is imparted; and (4) a method in which a precursor of a perpendicular aligning component that undergoes an addition reaction with the water-soluble monomer B, for example, a compound having an alkyl group and/or a halogenated alkyl group, and a functional group such as basic acid halide, haloformate, isocyanate, isothiocyanate, ketene, carbodiimide, epoxy, glycidyl ether, oxazoline, ethylenimine, ethyleneimine or lactone, is mixed with the oil-soluble monomer A and liquid crystal, and the mixture is dispersed in water, and subsequently, the water-soluble monomer B is added thereto, and perpendicular alignment property is introduced into the wall material synchronously with interfacial polymerization. In order to aid solubilization of the liquid crystal, the oil-soluble monomer A and the aforementioned precursor of a perpendicular aligning component, an organic solvent such as toluene, ethyl acetate or methylene chloride may also be added to the oily phase.

—In-situ Polymerization Method—

Examples of the in-situ polymerization method include: (1) a method of polymerizing the oil-soluble monomer A and the monomer C; (2) a method of using a monomer D that is independently polymerizable as is the case with a radical polymerizable monomer; and the like. In the method (1), as the monomer A, the monomer A described in the section of the interfacial polymerization method as shown above can also be used, and examples thereof include a polyvalent compound having, in one molecule, plural functional groups such as basic acid halide, haloformate, isocyanate, isothiocyanate, ketene, carbodiimide, epoxy, glycidyl ether, oxazoline, ethylenimine, lactone or the like. In the method (2), examples of the monomer D include a polyvalent epoxy compound, a polyvalent isocyanate compound, an unsaturated hydrocarbon compound such as styrene, isoprene, butadiene, vinyl chloride, vinylidene chloride, acrylonitrile, acrylic acid derivative, methacrylic acid derivative or the like. Further, the wall material can be made from the aqueous phase, and in this case, a water-soluble monomer such as melamine/formaldehyde is used.

As the method of introducing a perpendicular aligning component, there can be used: (1) a method of adding a surfactant that is a perpendicular aligning component, to the aqueous phase or oily phase; (2) a method in which a precursor of a perpendicular aligning component that undergoes an addition reaction with the oil-soluble monomer A or monomer C, for example, a compound having an alkyl group and/or halogenated alkyl group, and a functional group such as basic acid halide, haloformate, isocyanate, isothiocyanate, ketene, carbodiimide, epoxy, glycidyl ether, ethylenimine, lactone, amine, glycol, carboxylic acid, mercaptan or the like is made to undergo in advance an addition reaction with the oil-soluble monomer A or monomer C, and subsequently, polymerized by being dispersed in water; (3) a method in which a precursor of a perpendicular aligning component that undergoes an addition reaction with the water-soluble monomer A or monomer C, a mixed solution of the monomer A, monomer C and liquid crystal are dispersed in water, and at the same time as polymerization, are made to undergo an addition reaction with each other; and (4) a method in which a precursor of a perpendicular aligning component that undergoes an addition reaction with the monomer D, for example, a compound having an alkyl group and/or a halogenated alkyl group, and having an unsaturated hydrocarbon group, and a mixed solution of the monomer D and liquid crystal are dispersed in water, and at the same time as polymerization, are made to undergo an addition reaction with each other.

The average particle size of the microcapsules to be formed is preferably 4 or about 4 μm or more, and 20 or about 20 μm or less, more preferably 5 μm to 9 μm.

If the average particle size is less than 4 μm, there are cases in which good display contrast may not be obtained. If the average particle size exceeds 20 μm, the irregularities on the surface of the display layer may become relatively large. In this instance, there are cases in which such a planar surface that no air bubble remains on the interface in the finally manufactured display medium could not be formed even when a softening/planarizing step described below is carried out.

The average particle size of the microcapsules can be measured, as a volume-average particle size by a Coulter counter.

The aforementioned binder is not a final composition, and may also be used in the form of a precursor. For example, in the case of a resin, the form of a monomer or oligomer can be employed. In the case of glass or ceramic, the form of sol-gel material such as metal alkoxide can be employed. In such cases, a process in which after coating a substrate, the precursor is converted to a final composition by means of proper hardening processing such as heating, ultraviolet irradiation, electron irradiation or the like, becomes necessary.

In formation of the display layer 13, printing methods such as screen printing, relief printing, intaglio printing, planographic printing, flexographic printing and the like, and coating methods such as spin coating, bar coating, dip coating, roll coating, knife coating, die coating and the like are used, and a printing device, a coating device and the like that are respectively suitable for the aforementioned methods can be used (a display layer forming part).

The film thickness of the display layer 13 may be in the range from 10 μm to 100 μm.

Further, the display layer 13 does not need to directly come into contact with the substrate 11a as long as it is formed on the substrate 11a. For example, as in the present exemplary embodiment, various layers may be provided such that the electrode 12a is interposed between the display layer 13 and the substrate 11a, or an anchor coat layer is provided between the display layer 13 and the substrate 11a for the purpose of improvement in the adhesive force therebetween, or an insulating layer is provided between the electrode 12a and the display layer 13 for the purpose of preventing occurrence of short circuit.

In the step (3) of FIG. 3, the softening/planarizing process of the display layer 13 is carried out.

The aforementioned surface irregularities of the display layer 13 can be reduced to a certain degree by increasing the compounding ratio of the binder in respect to the display material or by reducing the particle size of the dispersed display material. However, when the compounding ratio of the binder increases, an increase of a voltage (driving voltage) required for display could be caused. Further, even if the particle size of the display material is made small, due to such a constraint that the particle size needs to be at least several μm in order to obtain a favorable display contrast ratio using cholesteric liquid crystals, there is a limit to the reduction of the irregularities on the surface. Moreover, it is also considered that the irregularities are made smooth with, for example, adhesives, and then, bonding of the layers is carried out. However, the film thickness becomes relatively large when a planarized layer is provided. Therefore, there existed a problem that although the aforementioned approaches have the effect in the reduction of the irregularities on the surface, a driving voltage would increase as is the case with that of increasing the compounding ratio of the binder.

To the contrary, it may also be considered that the formed surface of the display layer 13 is subjected to planarization by conventionally known super-calendering. However, the microcapsules in the display layer of the present exemplary embodiment each include a polymer that serves as wall material, and the capsule wall is hard. For this reason, in a case in which planarization is carried out only using pressure (in some cases, heating), the capsule wall may be broken. Further, the super-calandering device or the like is of a large size, and might not be simple as a manufacturing apparatus.

In the present exemplary embodiment, the aforementioned various problems are eliminated by taking an approach that facilitate planarization from the side of the display layer. Specifically, the display layer 13 is softened in advance, and thereafter, is pressurized in the softened state for the purpose of planarization. Consequently, particularly, the surface side of the display layer 13 becomes softened during the planarization processing, and therefore, sufficient smoothness of the display layer can be obtained at a low pressure and without the need for application of pressure at multiple stages. Further, in this case, the display layer 13 is soft at the time of applying pressure, and therefore, no excessive pressure is applied to microcapsules of liquid crystal, and even if the planarization processing is carried out to such a degree that a desired surface roughness is provided, microcapsules within the display layer could not be broken.

The aforementioned softening process is not particularly limited as long as a process of softening to such a degree that the binder in the display layer 13 is apt to be deformed by application of pressure is used. As physical stimulation required for the softening processing, for example, heating, swelling caused by permeation of liquid, swelling caused by vaporization of an organic solvent, or the like is exemplified. Among these stimulations, in view of efficiently softening the surface of the display surface without imparting any adverse effect that liquid crystals or microcapsules may be deformed or deteriorated, it is desirable that swelling by permeation of liquid is effected. It should be noted that in the softening processing is carried out using the aforementioned desirable method, mainly, a water-soluble resin such as polyvinyl ether (PVA) or polyvinyl butyral needs to be used.

The method using the aforementioned swelling by permeation will be described hereinafter.

Figure 4:
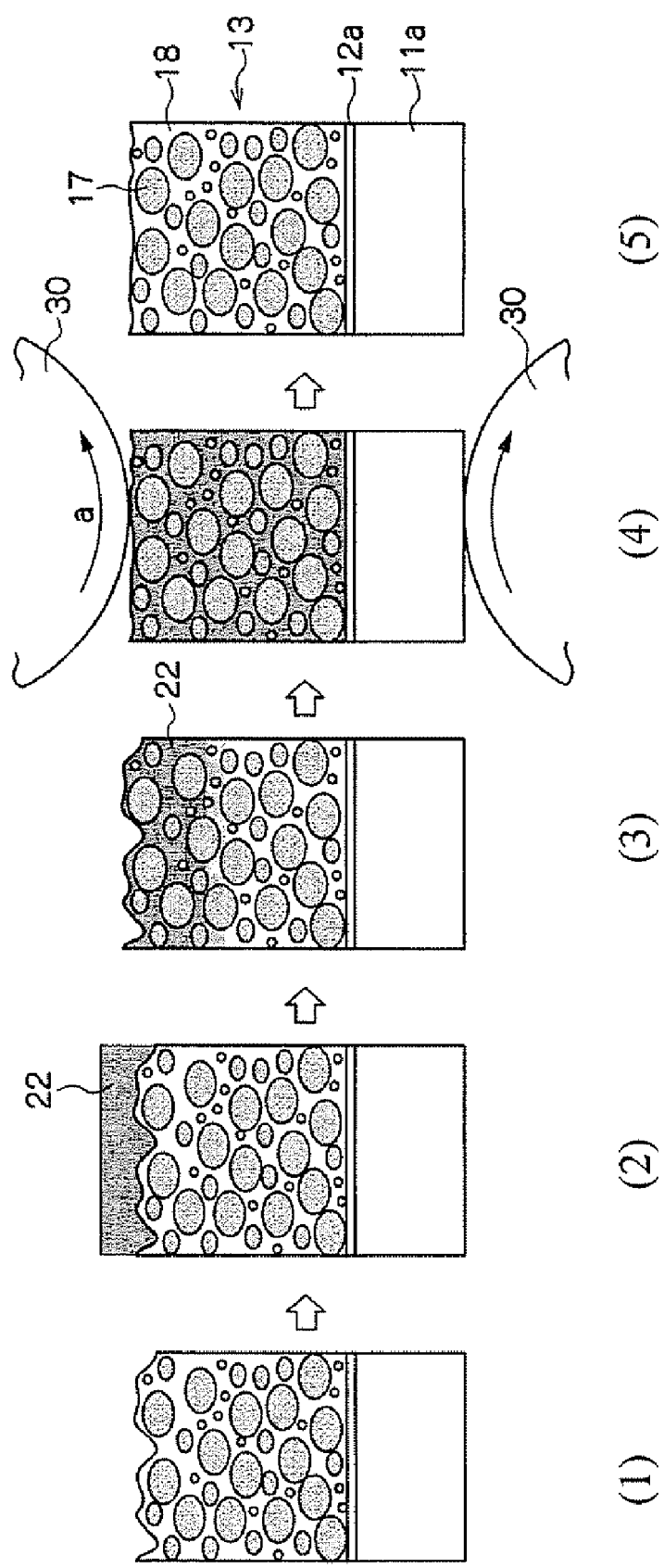
FIG. 4 is a schematic diagram showing an example of a softening/planarizing process.

FIG. 4 is a diagram that schematically shows that, as an example of the softening/planarizing process, the softening is effected by means of the swelling by permeation and thereafter the planarization is effected. In FIG. 4, reference number 11a denotes a substrate, and reference number 12a denotes an electrode.

First, for the formed display layer 13 shown in the stage (1) of FIG. 4, a liquid 22 is supplied to the surface of the display layer and is permeated in to the layer. Preferred examples of the liquid 22 include a liquid that is permeated only into the binder 18, but not permeated into the liquid crystal capsule 17, that is to say, an aqueous medium having excellent permeability is preferably used, since PVA or the like is suitably used as the binder 18 from the standpoint of stably dispersing the liquid crystal material.

The aqueous medium mentioned herein refers to water only, and a liquid that contains at least 50% by volume of water, an organic solvent and the like. Further, examples of the organic solvent include alcohols such as ethanol, 2-propanol, ethylene glycol and the like; esters such as ethyl acetate, butyl acetate and the like; ketones such as acetone, methyl ethyl ketone; and cellosolves such as ethyl cellosolve, cellosolve acetate and the like.

The method of supplying the liquid 22 to the surface of the display layer is not particularly limited, but it is preferably carried out using a method or device that allows a uniform amount of the liquid to be supplied to the surface of the display layer, such as direct coating using slits, spray coating or vapor spraying (a softening/planarizing part).

Further, the amount of the liquid 22 supplied is preferably in the range of 5 g/m to 500 g/m$^2$, more preferably in the range of 10 g/m$^2$ to 100 g/m$^2$.

After supplying the liquid as described above, the planarization process such as application of pressure may be immediately carried out depending on the type of the binder, and the kind of the supplied liquid. As shown in the stage (3) of FIG. 4, the liquid 22 may be left to stand until it is brought into a state of being permeated at least into a region in the vicinity of the surface of the display layer 13 and then swelling over a certain period of time. More suitably, at the time of the planarization process, the liquid may be brought into the state of being permeated entirely into the display layer 13 and swelling. Further, at this time, or also at the time of supplying the liquid, heating that facilitates permeation of the liquid may also be carried out.

The aforementioned certain period of time the liquid is left to stand is preferably 0.01 to 1 hour, more preferably 0.1 hour to 0.5 hour. Further, the state in which the liquid is permeated and swells sufficiently for planarization of the layer can be confirmed by an optical microscopic image.

Next, the planarization process will be described.

The method for planarization is not particularly limited as long as it allows smoothness of the irregularities on the surface of the display layer. A pressure planarization may be used in which the softened surface of the display layer is subjected to uniform surface pressure to form a planarized surface. Examples of the pressure device include a pressure roll, a pressure press, vacuum pressure and the like, and a conventional calendering device may also be used (a softening/planarizing part).

For example, as shown in the stage (4) of FIG. 4, when the planarization processing using a pair of rolls 30 is carried out, at least one of the pair of rolls 30 is a metal roll, the nip pressure between rolls is set in the range from 50 N/m to 4000 N/m, the nip pass-through time is set in the range from 100 msec to 900 msec, and thus, the object including the display layer is made to pass through between the roll pair.

At this time, application of pressure may be effected while heat is applied, by, for example, increasing the temperature of the metal roll. The heating temperature is preferably in the range from 50° C. to 90° C., more preferably 70° C. to 80° C.

Examples of the material of the rolls used for the aforementioned pair of rolls 30 include a resin such as thermosetting polyimide, thermoplastic polyimide, polyamide or polyamide-imide or polyurethane, metal such as iron, stainless steel, nickel, copper, aluminum or brass, rubber such as silicone rubber or fluorine rubber.

After the planarization, the display layer 13 may be completely dried and fixed at room temperature or in a heating atmosphere as shown in the stage (5) of FIG. 4. It should be noted that, as long as the condition that allows sufficient drying is set in the planarization process, drying at this stage is not necessary.

The surface roughness of the display layer 13 planarized by using the aforementioned softening/planarizing process is preferably 0.5, or about 0.5 μm or less based on the arithmetic average roughness Ra, more preferably 0.3 μm or less.

If Ra of the surface exceeds 0.5 μm, there are cases in which if the display layer is made to adhere to a substrate having a functional layer, air bubbles remain in the interface, thereby causing roughness in the display or the like.

The arithmetic average roughness Ra of the display layer is measured by a laser microscope.

In the right-side steps in FIG. 3, a functional layer to be bonded to the display layer 13 is formed on the surface of a substrate (second substrate). Although the functional layer is not particularly limited, a layer having the function of protecting the display layer 13, a layer having the function of converting external simulation such as light to change alignment status of liquid crystals in the display layer, a layer having the function of improving adhesive properties, the layer having the function of improving optical characteristics of a reflection film or light shielding film, and the like may be exemplified. In the steps (4) to (7) of FIG. 3, the light shielding layer 14 and the photo-conductive layer 15 are formed as the functional layers.

The light shielding layer 14 formed in the steps (4) of FIG. 3 is provided for the purpose of shielding light transmitted from the side of the substrate 11b. The range of wavelength of the light to be shielded is an entire region of visible wavelength, and a desired light shielding property needs to be exhibited in the wavelength region of, particularly, 400 nm to 700 nm. Therefore, the light shielding layer 14 is usually black. For the light shielding property, the optical density of transmitted light is at least 0.5 or more, more preferably 1 or more.

The material of the light shielding layer 14 is not particularly limited as long as it is black material. Examples thereof include:
(1) black coating material in which a black pigment such as an organic pigment, for example, carbon black or aniline black, a CuO, MnO, $Cr_2O_3$, or Fe—Cr based pigment, an inorganic pigment, for example, a Cu—Fe—Mn based pigment, or the like is dispersed in a resin binder such as an acrylic resin, an epoxy resin, a polyester resin or a polyurethane resin;
(2) a resin dyed with a black dye; and
(3) a vapor-deposition film of black material.

Examples of the method of forming the light shielding layer 14 include:
(1) a coating method in which resin coating colored with a black pigment or black dye is applied;
(2) a vapor deposition method of vapor-depositing black dyestuffs;
(3) a method in which a receptor layer is formed on the display layer 13 and is colored with a black dye; and
(4) a method in which the light shielding layer 14 formed on another substrate is transferred to the display layer 13.

In a case in which the light shielding layer 14 is formed by a water-based coating, examples of the binder therefor include a water-soluble resin, a water/organic solvent-soluble resin, a water-based emulsion/dispersion/latex or the like.

The film thickness of the light shielding layer 14 may be in the range from 1 μm to 3 μm.

Next, in the step (5) of FIG. 3, the photo-conductive layer 15 is formed, as a switching element for driving the display layer 13, on the light shielding layer. Examples of the photo-conductive layer 15 include: (a) a layer made from, as inorganic semiconductor material, a semiconductor compound such as amorphous silicon, ZnSe, CdS or the like; (b) a layer made from, as an organic semiconductor material, anthracene, polyvinyl carbazole or the like; (c) a so-called OPC layer made of a mixture or a laminated body of charge generating material that generates charge due to irradiation of light, and charge transporting material that causes transfer of charge due to an electric field; and the like. In the present exemplary embodiment, the photo-conductive layer 15 may be formed by coating, and therefore, the aforementioned materials (b) and (c) may be used.

Examples of the charge generating material include perylene based, phthalocyanine based, bisazo based, dithiopitokero pyrrole based, squalelium based, azurenium-based, thiapyrilium/polycarbonate based compounds. Further, examples of the charge transporting material include trinitrofluorene based, polyvinyl carbazole based, oxadiazole based, pyrarizone based, hydrazone based, stilbene based, triphenyl amine based, triphenyl methane based, and diamine based compounds, an ion conducting material such as polyvinyl alcohol or polyethylene oxide to which $LiClO_4$ is added, and the like. Moreover, as a complex of the charge generating material and the charge transporting material, laminated material, mixture, microcapsules and the like can be used.

The photo-conductive layer 15 is preferably the aforementioned OPC layer since a film is formed by coating. The OPC layer may have a so-called dual CGL (Charge Generating Layer) structure in which charge generating layers are provided on the upper and lower sides of the charge transporting layer, respectively.

The coating liquid for each of the layers is prepared by dissolving or dispersing, in each of solvents, the material suitably used for the aforementioned charge generating layer or charge transporting layer. In this case, examples of the solvent include water, methanol, ethanol, n-propanol, n-butanol, benzylalcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These usual solvents may be used singly or may be used in a combination of two or more.

The film thickness of the photo-conductive layer 15 may be in the range of 1 μm to 100 μm, and the resistance ratio of the layer between the state of exposure light being irradiated thereon, and the state of no exposure light being irradiated may be large.

It should be noted that as the aforementioned switching element, an active element such as a thin-film transistor, a thin-film diode, a MIM (Metal-Insulator-Metal) element or the like may be provided.

Subsequently, in the step (7) of FIG. 3, the display layer 13 formed on the substrate 11a and the photo-conductive layer 15 formed on the substrate 11b are bonded to each other. The bonding of these layers are carried out in such a manner that the adhesive layer 16 is formed on any one of the display layer 13 and the photo-conductive layer 15, and subsequently, the display layer 13 and the photo-conductive layer 15 are bonded so as to face each other.

Examples of the material of the adhesive layer 16 include well known adhesives such as acrylate based, urethane based, cyanoacrylate based, silicone based, rubber based (for example, isoprene), an ethylene-vinyl acetate copolymer and the like. The type of the adhesive is not particularly limited. For example, a two-liquid curable adhesive, a thermosetting adhesive, a moisture-curable adhesive, an ultraviolet-curable adhesive, hot-melt adhesive, pressure-sensitive adhesive and the like. The adhesive layer 16 can be formed by any of the following methods (1) to (3) and the like.
(1) a coating method in which the an adhesive is applied to the light shielding-layer 14 or the substrate 11b (photo-conductive layer 15);
(2) a transfer method in which an adhesive applied to another substrate is transferred to the light shielding layer 14 or to the substrate 11b (photo-conductive layer 15); and
(3) an adhesive film method in which the an adhesive processed in the shape of a film is used to adhere the light shielding layer 14 and the substrate 11b (photo-conductive layer 15) to each other with the adhesive film interposed therebetween.

In the coating method, the adhesive layer 16 may be applied to either the display layer 13 or the photo-conductive layer 15, but from the standpoint of preventing occurrence of remaining air bubbles by smoothening the irregularities of the display layer 13, the adhesive layer 16 may be applied to the display layer 13. Further, the adhesive layer 16 colored in black may also serve as a light shielding layer.

In the bonding process, the following methods can be used, that is to say, a method in which the substrate 11a with the display layer 13 formed thereon, and the substrate 11b with the photo-conductive layer 15 formed thereon are bonded together and pressure bonded to each other by application of pressure; a method of thermo-compression bonding using heat and pressure; a bonding method using an adhesive; and the like. Accordingly, for example, a vacuum heat press or laminating device (a bonding part) can be used. When the thermo-compression bonding is used in a case in which the binder of the display layer 13, and the front-surface substrate 11a or rear-surface substrate 11b are each made from resin, the resin is softened and the remaining air bubbles can be reduced. These layers may also be bonded together in vacuum so as to prevent generation of air bubbles.

Second Exemplary Embodiment

Next, a description will be given of a display medium of the second exemplary embodiment, including a display layer in which three display layers whose liquid crystals have different selective wavelengths are stacked.

The display medium of this exemplary embodiment includes a display layer in which three display layers as described above are stacked, and has the same construction, material to be used, and manufacturing method as those in the case with the display medium shown in FIG. 1 except that in place of the single-layer type display layer 13 in the display medium shown in FIG. 1 a display layer in which three layers whose liquid crystal capsules have different selective wavelengths are stacked is used.

The three layers that form the display layer are not particularly limited as long as they include liquid crystal capsules whose color hues are different for each layer. However, for the purpose of providing full-color displaying, the respective reflection wavelength regions of liquid crystals are set so that reflected colors of liquid crystals included in the layers are display colors of blue, green and red.

For example, in a case in which cholesteric liquid crystal is used as the liquid crystal, the reflection wavelength region of liquid crystal (display color wavelength region) is adjusted by the helical pitch of the cholesteric liquid crystal as described above. The helical pitch of the cholesteric liquid crystal can be adjusted based on the amount of a chiral agent added to nematic liquid crystal. For example, in a case in which the display colors are blue, green and red, the central wavelengths of selective reflection of these colors are in the range of 400 nm to 500 nm, 500 nm to 600 nm, and 600 nm to 700 nm in the order of blue, green and red. Further, in order to compensate for the temperature dependency of the helical pitch of the cholesteric liquid crystal, a well known approach may also be used in which plural chiral agents having different helical directions or exhibiting reversed temperature dependency are added.

When the display layer is formed by stacking three layers including liquid crystal capsules using three types of liquid crystals that have different reflection wavelength regions, the aforementioned hard microcapsules are included in each of the layers. Therefore, the surfaces of the layers each become the surface having similarly large irregularities formed thereon. Accordingly, even when the three layers are stacked to form the display layer, air bubbles are apt to remain in the interfaces between the layers, thereby resulting in that roughness in the display or the like may be caused.

For this reason, in the display medium of this exemplary embodiment, not only the outermost surface of the display layer to be bonded to a functional layer is softened and planarized, but also when plural layers forming the display layer are stacked as well, the softening and planarizing processing is preferably carried out each time one of these layers is formed.

The display medium manufacturing method of the present exemplary embodiment is the same as that of the first exemplary embodiment except that the display layer is formed by stacking three layers as described above. Accordingly, in the present exemplary embodiment described below, a description will be given of formation of the display layer.

Figure 5:
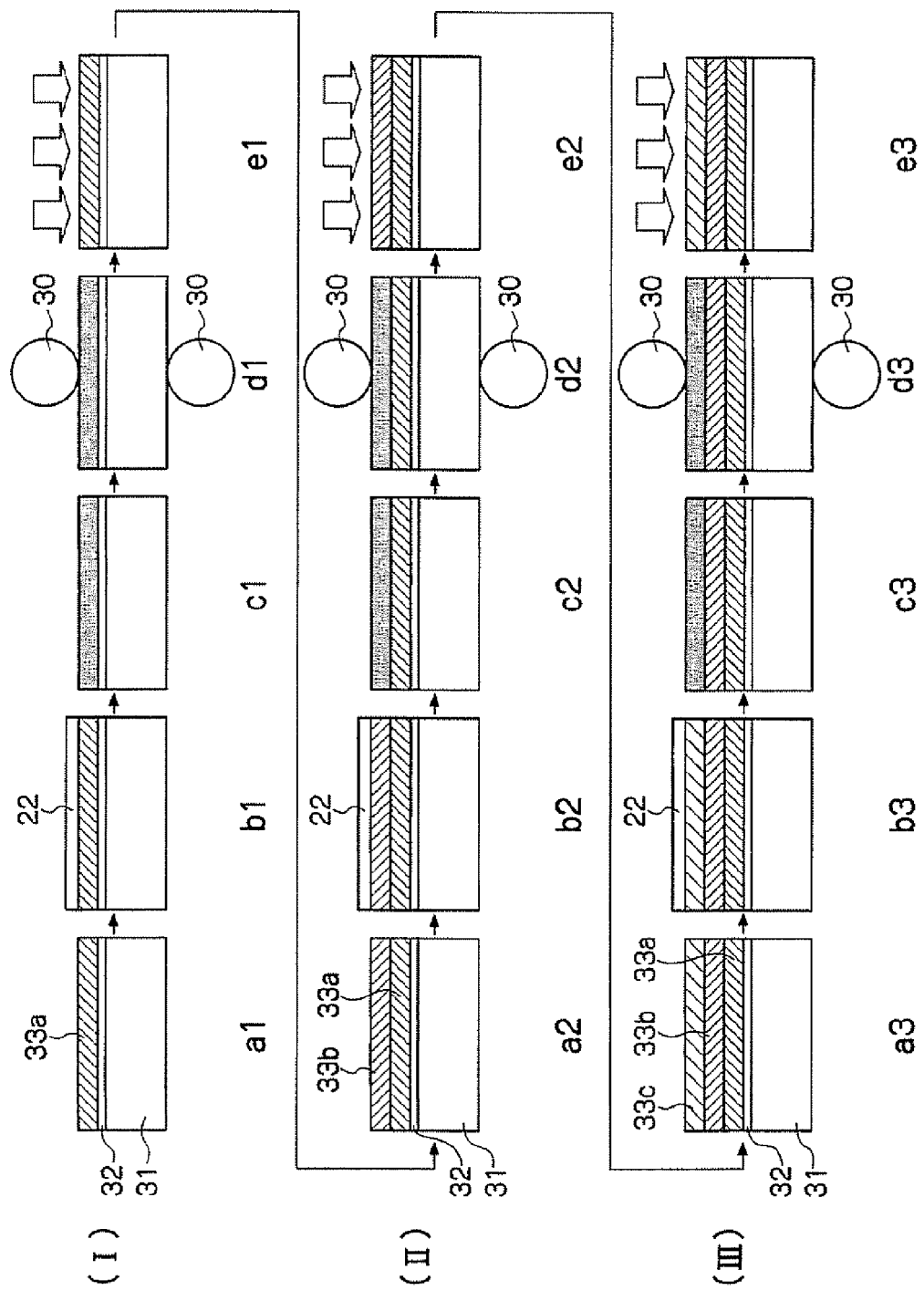
FIG. 5 is schematic diagram showing a process of forming a display layer of a display medium according to another embodiment.

FIG. 5 is a flow diagram that schematically shows the process of forming the display layer in the display medium of the present exemplary embodiment. In FIG. 5, reference number 31 denotes a substrate and reference number 32 denotes an electrode. As shown in this drawing, the display layer is formed by stacking layers mainly through three stages (I) to (III) of FIG. 5. These three stages each include five steps, that is, (a) a display layer coating step; (b) a liquid supplying step; (c) a permeation/swelling step; (d) a pressure/planarizing step; and (e) a drying/hardening step.

The stage (I) of FIG. 5 is one in which a red light reflection layer 33a (first layer), which is a first layer for forming the display layer, is formed on the substrate 31 with the electrode 32 formed thereon.

First, in step a1, the substrate 31 is coated with a coating liquid for forming a display layer, thereby forming the red light reflection layer 33a. Subsequently, this layer is fixed by being left to stand. Then, in step b1, a liquid 22 for permeation into the layer is supplied to the surface of the aforementioned reflection layer. In step c1, the liquid is permeated into the layer by being left to stand or the like. Subsequently, in step d1, pressure planarization is carried out by using the pair of rolls 30 under the same conditions as those of the first exemplary embodiment. At this point in time, the surface of the red light reflection layer 33a is planarized to such a degree that the arithmetic average roughness Ra is less than 5 μm.

Subsequently, in step e1, drying is carried out if necessary, and thereafter, the surface is cured by being irradiated with ultraviolet light as indicated by arrows in the figure. The reason that the layer surface is cured is that in the subsequent process, a green light reflection layer 33b (second layer) is formed directly on the red light reflection layer 33a, so that partial mixture between both layers could not occur.

The amount of ultraviolet light irradiated as described above may be in the range of 10 mJ/cm$^2$ to 500 mJ/cm$^2$.

As shown in the stage (I) of FIG. 5, the first layer of the display layer is formed, and subsequently, via steps a2 to e2, and a3 to e3 respectively shown in the stages (II) and (III) of FIG. 5, the green light reflection layer 33b that serves as the second layer, and a blue light reflection layer 33c are sequentially formed in that order, whereby the display layer having a three-layer structure is formed.

After the display layer is formed, the formed display layer is bonded to a substrate having the photo-conductive layer prepared by the steps (4) to (6) of FIG. 3 in the same manner as in the step (7) of FIG. 3, whereby the display medium of the present exemplary embodiment can be obtained.

In the display medium thus obtained, when the cross section thereof along a direction perpendicular to the surfaces of the disposed layers is observed, not only the aforementioned interface between the display layer and the photo-conductive layer, but also the shape of the interface between these color reflection layers forming the display layer are each formed as a wave-like line (an irregular line) such that the distance between the highest protruding portion and the lowest depressed portion is in the range from 0.5 µm to 2.0 µm, and no air bubble remain in the respective interfaces. As a result, the display medium of the present exemplary embodiment can present high quality display without causing roughness in the display or reducing display contrast.

The display medium of the present exemplary embodiment as described above is a light-writable display medium, but the present exemplary embodiment is not limited to the same. For example, the electrodes 12a and 12b shown in FIG. 1 may be processed into stripes to form a simple matrix type display medium. Alternatively, an active matrix driving type display medium may also be provided by forming, on the rear side substrate 11b, an active element such as a thin-film transistor, a thin-film diode, a MIM (Metal-Insulator-Metal) element or the like. Further, although the voltage response type display material is described by way of example, the display medium of the present exemplary embodiment is also effective in the case of a display medium of a type that is writable by using a thermal head or a laser beam on a heat response type display material.

In the display medium of the present exemplary embodiment, the aforementioned liquid crystal capsule/binder dispersion places emphasis on an optical difference between the P alignment and the F alignment in a memory state of the cholesteric liquid crystal. Therefore, apart from the selective reflection mode described above as the display mode, a scattering/transparent mode using a difference of light scattering intensity between the P alignment and the F alignment, a rotatory polarization mode using a difference of angle of rotation, a birefringence mode using a difference of birefringence, and the like may also be used. In this case, a polarization plate or a phase-difference plate may also be used as an auxiliary member. Further, a guest-host mode wherein dichroic dye is added to liquid crystal and displaying is effected may be used.

Furthermore, examples of the method of driving a display medium of the present exemplary embodiment include well known driving methods, for example, (1) a segment driving method in which the display medium is driven in such a manner as to be held between electrodes that are patterned in the shape of display, (2) a simple matrix driving method in which an image is written by linearly sequential scanning in such a state that a polymer/cholesteric liquid crystal dispersion is held between a pair of stripe-shaped electrode substrates that are perpendicular to each other, (3) an active matrix driving method in which the display medium is driven via active elements, for example, thin-film transistors, thin-film diodes or MIM (Metal-Insulator-Metal) elements, which elements are provided for each pigment, (4) an optical driving method in which an image is written in such a manner that the display medium and the photo-conductive body are held between a pair of electrodes and a voltage is applied while a light image being projected, (5) a thermal driving method in which an image is written in such a manner that a polymer/cholesteric liquid crystal dispersion held between a pair of electrodes is transferred to the P alignment by means of application of a voltage, and subsequently, heated by a laser or a thermal head to a phase transition temperature or higher, and (6) an electrostatic driving method in which an image is written by a stylus head or an ion head with a polymer/cholesteric liquid crystal dispersion being applied to an electrode substrate.

EXAMPLES

Hereinafter, the present invention will be described with reference to Examples, but it should be understood that the invention is not restricted to these Examples. In the description below, "part(s)" and "%" means "part(s) by weight" and "% by weight", respectively.

(Preparation of Display Medium)

A display medium having the structure shown in FIG. 1 is prepared.

—Formation of Display Layer—

84 parts of nematic liquid crystal E7 (available from Merck Ltd.), 10.8 parts of chiral agent R811 (available from Merck Ltd.), and 2.7 parts of chiral agent R1011 (available from Merck Ltd.) are mixed, whereby 100 parts of cholesteric liquid crystal having a selective reflection wavelength of 650 nm is obtained. The cholesteric liquid crystal thus obtained, 10 parts of TAKENATE D-110N (available from MITSUI CHEMICALS POLYURETHANES, INC.) as a polyvalent isocyanate, 3 parts of octadecanol (available from Aldrich Company) as a precursor of a perpendicular aligning component, and 0.6 parts of particle species (colloidal silica particles: average particle size 70 nm, produced by Fuso Chemical Co., Ltd.) are dissolved in 1000 parts of ethyl acetate, whereby an oily phase composition is prepared. This composition is put into 10,000 parts of 1% aqueous solution of polyvinyl alcohol, and stirred and dispersed by a mixer, whereby an o/w emulsion of about 7 µm in the diameter is prepared.

To the aforementioned emulsion, 100 parts of 10% aqueous solution of polyallylamine (available from Nitto Boseki Co., Ltd.) is added, and the mixture is heated at 70° C. for 2 hours, whereby a microcapsule including polyurea that serves as wall material is prepared. The microcapsule is collected by centrifugation, and thereafter, an aqueous solution of polyvinyl alcohol is added, thereby forming a microcapsule liquid crystal coating.

Subsequently, the aforementioned microcapsule liquid crystal coating is applied to a commercially-available ITO vapor-deposition PET resin film using an applicator so that the dried film thickness becomes 30 µm, whereby the display layer 13 is prepared. The surface roughness of the display layer 13 thus formed is measured by a laser microscope, and its arithmetic average roughness (Ra) is 1.1 µm.

On the other hand, two samples in which the display layer 13 is formed on the substrate are prepared. Calendering processing is carried out for one sample, and softening/planarizing processing is carried out for the other sample.

The calendering processing is performed in such a manner that the display layer 13 is calendered once using a super calender having a combination of a metal roll whose surface temperature is 90° C., and an elastic cotton roll. The surface of the display layer having been calendered has the arithmetic average roughness Ra of 0.9 µm.

With regard to the softening/planarizing processing, first, water is uniformly supplied to the surface of the display layer by a spray coating. The amount of water used at this time is about 5 g/m². Subsequently, the surface is left to stand at 25° C. for 0.01 hour, so that the supplied water is sufficiently permeated into the display layer 13 and made to swell.

Then, the display layer is subjected to pressure-planarizing processing once by using a pair of rolls (two silicone rubber rolls) under the condition that the pressure force is 100 N/m and nip pass-through time is about 200 msec. The arithmetic average roughness Ra of the surface of the display layer having been subjected to the softening/planarizing processing is 0.5 μm.

Figure 6A:
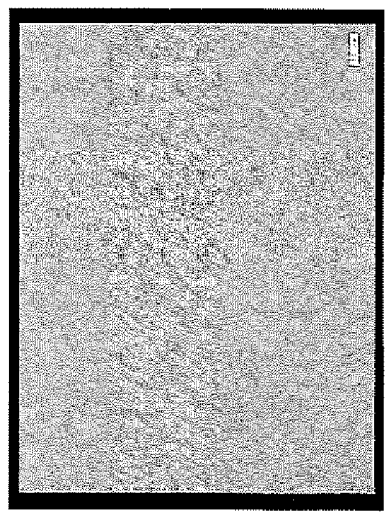
FIGS. 6A, 6B and 6C are laser microphotographs each showing the surface of a display layer.
Figure 6B:
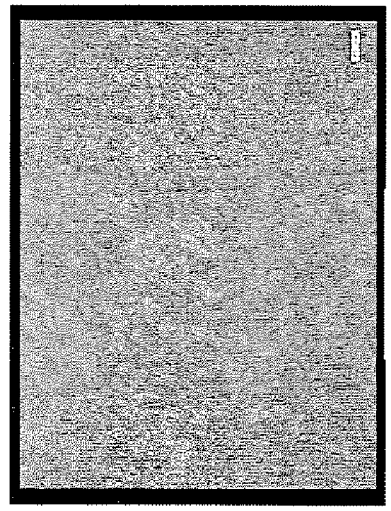
Figure 6C:
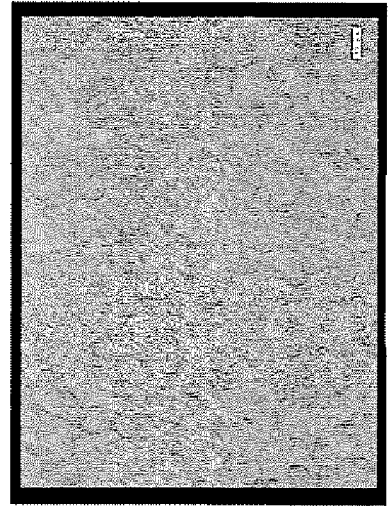

Just for reference, observation photographs (having a magnification power of 500) obtained by observation using a laser microscope (VK-8000: trade name, available from Keyence Corporation), showing the surface of the display layer having been unprocessed, planarized and the like are shown in FIGS. 6A to 6C. FIG. 6A shows an unprocessed surface, FIG. 6B shows a surface subjected to calendering processing, and FIG. 6C shows a surface subjected to softening/planarizing processing. Moreover, FIG. 7 shows the profiles of the cross sectional surfaces obtained by data analysis of the aforementioned photographs.

Figure 7:
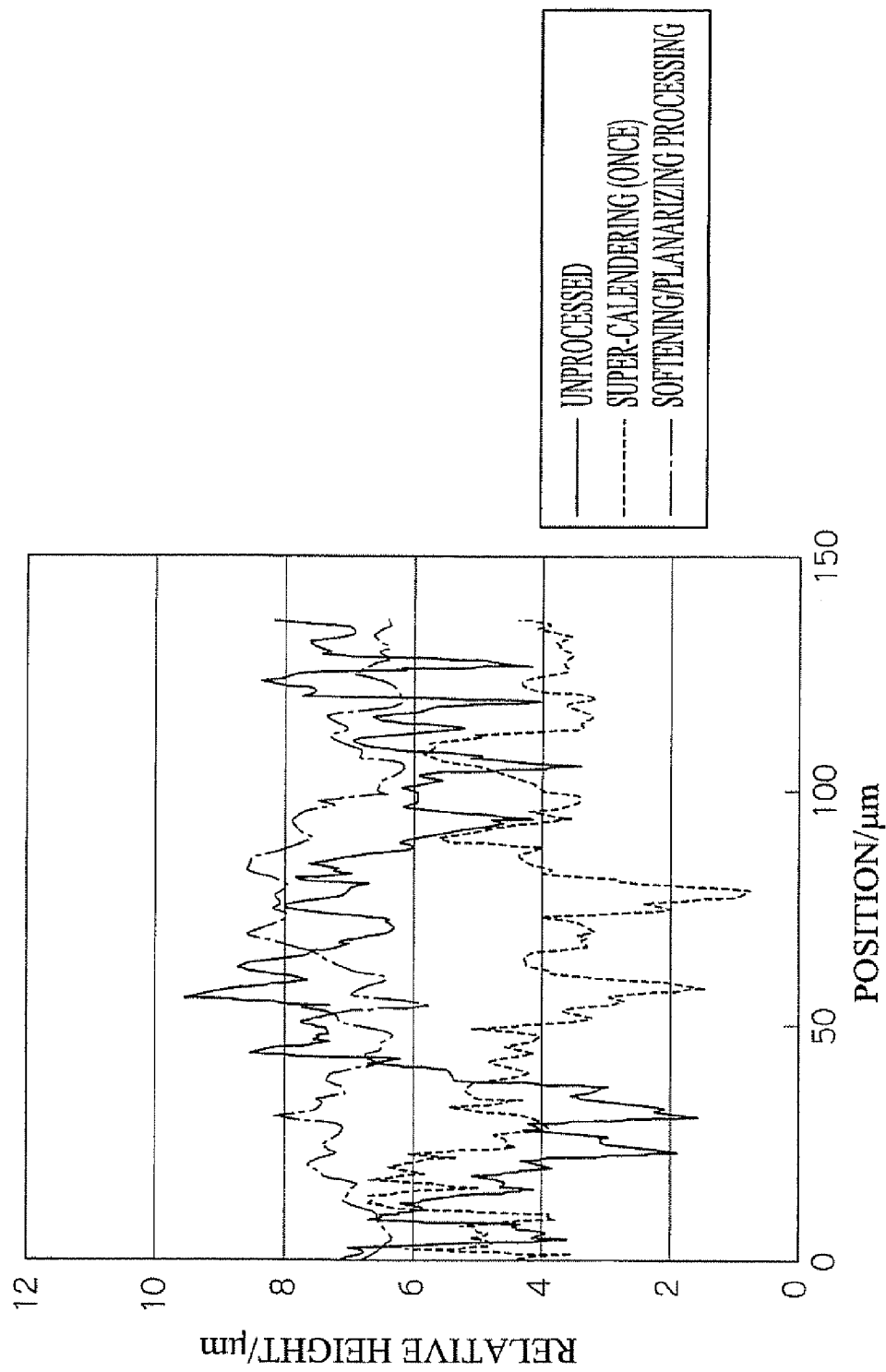
FIG. 7 is a graph showing cross sectional profiles of the display layer surface obtained by data analysis of the laser microphotographs shown in FIGS. 6A to 6C.

The profiles of the cross sectional surfaces shown in FIG. 7 each correspond to the shape of the interface between the display layer 13 and the adhesive layer 16 in the cross section of the display medium. As shown in this drawing, the surface configuration having been subjected to the softening/planarizing processing is relatively smoother than the unprocessed surface or the calendered surface.

—Preparation of Display Medium—

Next, a black coating is prepared by mixing a commercially-available carbon black water-dispersion WA color black A01 (available from Dainichiseika Color & Chemicals Mfg. Co., Ltd.), and a polyvinyl alcohol solution, and is applied to the display layer by an applicator so that the dry film thickness becomes 3 μm, whereby the light shielding layer 14 is formed.

Then, 3 g/m$^2$ of a two-liquid urethane based adhesives (DICDRY: trade name, available from Dainippon Ink & Chemicals, Inc.) is applied to the light shielding layer 14 by bar coating, whereby the adhesive layer 16 is obtained.

On the other hand, commercially-available ITO vapor-deposition PET resin films are prepared as the substrate 11b and the electrode 12b. Three layers made of a first charge generating layer, a charge transporting layer, and a second charge generating layer are formed as the photo-conductive layer 15. First, an alcohol solution of a polyvinyl butyral resin with phthalocyanine pigment based charge generating material dispersed therein is subjected to spin coating, and the first charge generating layer having the thickness of 0.1 μm is formed. Next, the first charge generating layer is coated with a chlorobenzene solution of diamine based charge transporting material and a polycarbonate resin by an applicator, whereby a charge transporting layer having a thickness of 3 μm is formed. Finally, the alcohol solution of a polyvinyl butyral resin with phthalocyanine pigment based charge generating layer dispersed therein is subjected to spin coating, and the second charge generating layer having the thickness of 0.1 μm is formed, whereby the photo-conductive layer 15 is obtained.

Finally, the substrate 11a and the substrate 11b thus prepared are stacked so that the adhesive layer 16 and the photo-conductive layer 15 face each other, and bonded together by using a laminator heated at 110° C., whereby the display medium is completed.

A display element prepared by using the unprocessed display layer means display element A, a display element prepared by using the display layer subjected to calendering processing means display element B, and a display element prepared by using the display layer subjected to softening/planarizing processing means display element C.

(Evaluation of Display Medium)

A driving test of these display media is conducted in such a manner as described below.

—Display Roughness, Display Contrast—

First, as shown in FIG. 1, the electrode 12a and electrode 12b of the display medium 1 are each connected to the voltage application part 2 formed by a pulse generator and a high-voltage amplifier. Further, a mask pattern having a bright part and a dark part, and an exposure part 3 including an LED light source having a wavelength of 650 nm are prepared. The mask pattern is adhered to the substrate 11b and exposed with light from the LED light source. The control part 4 that determines timing of exposure and application of a voltage is operated by a human operator in this test, and the voltage application part 2 and the exposure part 3 are operated by a manual operation. While the photo-conductive layer 15 being exposed with light, 200 ms of burst pulse having a voltage of 300 V and a frequency of 10 Hz is applied to between the electrodes 12a and 12b, and an image of the mask pattern is written on the display medium 1.

As a result, a favorable black display can be obtained on the display medium C without causing roughness caused by air bubbles in the dark part of the written image. The display contrast ratio between the bright part and the dark part is 10:1.

On the other hand, roughness that appears to be based on remaining air bubbles in the dark part of the image is observed on each of the display media A and B. The display contrast ratio between the bright part and the dark part is 8:1 in the case of the display medium A, and 7:1 in the display medium B. Thus, both of the display media A and B are inferior to the display medium C.

—Evaluation of Graininess—

Under the same driving condition as described above, a Ming-cho type-font character image is written in the sample display media, and the graininess is evaluated by classifying into 10 grades based on visual judgments (grades 1 to 10). The graininess of grade 10 is the best, and that of the grade 1 is the worst.

As a result, the display medium C is ranked as grade 8, but the display medium A is ranked as grade 4 and the display medium B is ranked as grade 3. Thus, the display medium A and the display medium B are both inferior to the display medium C in which the display layer is subjected to the softening/planarizing processing.

The foregoing description of the embodiments of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practice applications, thereby enabling others skilled in the art to understand invention for various embodiments and with the various modifications as are suited to the particular use contemplated. It is intended that the scope of the invention be defined by the following claims and their equivalents.

What is claimed is:

1. A display medium comprising:
a pair of substrates;
a pair of electrodes disposed on the pair of substrates and facing each other; and
a functional layer and a display layer disposed between the pair of electrodes with an adhesive layer disposed between the functional layer and the display layer,
the display layer comprising a binder and microcapsules dispersed in the binder, the microcapsules comprising a polymer serving as a wall material and a liquid crystal enclosed therein, and a shape of an interface of the display layer at least on the side of the adhesive layer in a cross section along a thickness direction of the disposed layers being an irregular line having a distance between a highest protruding portion and a lowest depressed portion from about 0.5 µm about 2.0 µm.

2. The display medium according to claim 1, wherein the average particle size of the microcapsules is from about 4 µm to about 20 µM.

3. The display medium according to claim 1, wherein the liquid crystal is cholesteric liquid crystal.

4. The display medium according to claim 1, wherein the display layer comprises at least two layers in which microcapsules having liquid crystals that have different selective wavelengths are enclosed, and a shape of an interface between the at least two layers in a cross section along a thickness direction of the disposed layers being an irregular line such that a distance between a highest protruding portion and a lowest depressed portion is in the range from about 0.5 µm to about 2 µm.

5. A manufacturing apparatus of the display medium according to claim 1, comprising:
    a display layer forming part that forms a display layer on a first substrate;
    a functional layer forming part that forms a functional layer on a second substrate;
    a softening/planarizing part that softens and planarizes a surface of the formed display layer; and
    a bonding part that bonds the display layer having the planarized surface, and the functional layer to each other.

6. A manufacturing method of the display medium according to claim 1, comprising:
    forming a display layer on a first substrate;
    forming a functional layer on a second substrate;
    softening and planarizing a surface of the formed display layer; and
    bonding the display layer having the planarized surface, and the functional layer to each other.

7. The manufacturing method of a display medium according to claim 6, wherein in the softening of the softening and planarizing, a liquid is made to permeate into the surface of the display layer causing it to swell.

8. The manufacturing method of a display medium according to claim 6, wherein an arithmetic average roughness Ra of the surface of the display layer which has been planarized by the softening and planarizing is about 0.5 µm or less.

9. The manufacturing method of a display medium according to claim 6, wherein the display layer is softened in advance of a planarization process to obtain a smoothness at a low pressure.

10. The display medium according to claim 1, wherein the display layer is softened in advance of a planarization process to obtain a smoothness at a low pressure.

* * * * *